United States Patent [19]

Tanioka et al.

[11] Patent Number: 5,577,136
[45] Date of Patent: Nov. 19, 1996

[54] IMAGE PROCESSING APPARATUS

[75] Inventors: Hiroshi Tanioka; Yasuhiro Yamada, both of Yokohama, Japan

[73] Assignee: Canon Kabushiki Kaisha, Tokyo, Japan

[21] Appl. No.: 460,821

[22] Filed: Jun. 2, 1995

Related U.S. Application Data

[63] Continuation of Ser. No. 7,815, Jan. 22, 1993, abandoned, which is a continuation of Ser. No. 587,217, Sep. 24, 1990, abandoned.

[30] Foreign Application Priority Data

Sep. 27, 1989 [JP] Japan .................................. 1-249201
Oct. 23, 1989 [JP] Japan .................................. 1-273840
Oct. 26, 1989 [JP] Japan .................................. 1-277256

[51] Int. Cl.$^6$ ........................................................ G06K 9/38
[52] U.S. Cl. ........................... 382/270; 382/272; 382/252; 358/466
[58] Field of Search ................................... 382/270, 271, 382/272, 273, 237, 251, 252, 298, 302; 358/456, 457, 458, 466

[56] References Cited

U.S. PATENT DOCUMENTS

| | | | |
|---|---|---|---|
| 4,821,334 | 4/1989 | Ogino et al. | 382/50 |
| 4,868,884 | 9/1989 | Miyazaki et al. | 382/50 |
| 4,879,753 | 11/1989 | El-Sherbini | 382/50 |
| 4,903,316 | 2/1990 | Hongo et al. | 382/50 |
| 4,920,501 | 4/1990 | Sullivan et al. | 382/52 |
| 4,955,065 | 9/1990 | Ulichney | 382/50 |
| 4,975,786 | 12/1990 | Katayama et al. | 382/50 |
| 4,999,629 | 3/1991 | Katsuta | 382/50 |
| 5,008,950 | 4/1991 | Katayama et al. | 382/50 |
| 5,018,024 | 5/1991 | Tanioka | 382/52 |
| 5,086,484 | 2/1992 | Katayama et al. | 382/50 |
| 5,150,429 | 9/1992 | Miller et al. | 382/54 |
| 5,157,741 | 10/1992 | Katayama | 382/50 |
| 5,177,795 | 1/1993 | Tanioka et al. | 382/50 |

FOREIGN PATENT DOCUMENTS 57-104369  10/1982  Japan ............................ G06K 9/38

Primary Examiner—Leo Boudreau
Assistant Examiner—Phuoc Tran
Attorney, Agent, or Firm—Fitzpatrick, Cella, Harper & Scinto

[57] ABSTRACT

There is disclosed an image processing apparatus for intermediate tone processing of an image signal into a binary signal, capable of providing a reproduced image with excellent resolution and gradation with a simple structure, and without the periodic texture inherent to the conventional error dispersing method or average density conserving method. The disclosed apparatus determines the average density of an already binarized predetermined image area, binary digitizing the image signal of a contemplated pixel, utilizing the determined average density as the threshold value, and distributing the error, generated in the binary digitization, to the image data of plural pixels to be digitized thereafter with certain distribution factors. The distribution factors are randomly changed according to random numbers generated by a generator, so that the reproduced image is free from periodic patterns resulting from periodic distributions of the errors.

17 Claims, 15 Drawing Sheets

FIG. 1A

| f(i-2, j-1) | f(i-2, j) | f(i-2, j+1) |
|---|---|---|
| f(i, j-1) | f(i-1, j) | f(i-1, j+1) |
| f(i, j-1) | f(i, j) | f(i, j+1) |

FIG. 1B

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | |

FIG. 1C

| R(2, 1) | R(2, 0) | R(2, -1) |
|---|---|---|
| R(1, 1) | R(1, 0) | R(1, -1) |
| R(0, 1) | R(0, 0) | R(0, -1) |

R(0, 0) R(0, -1)=0

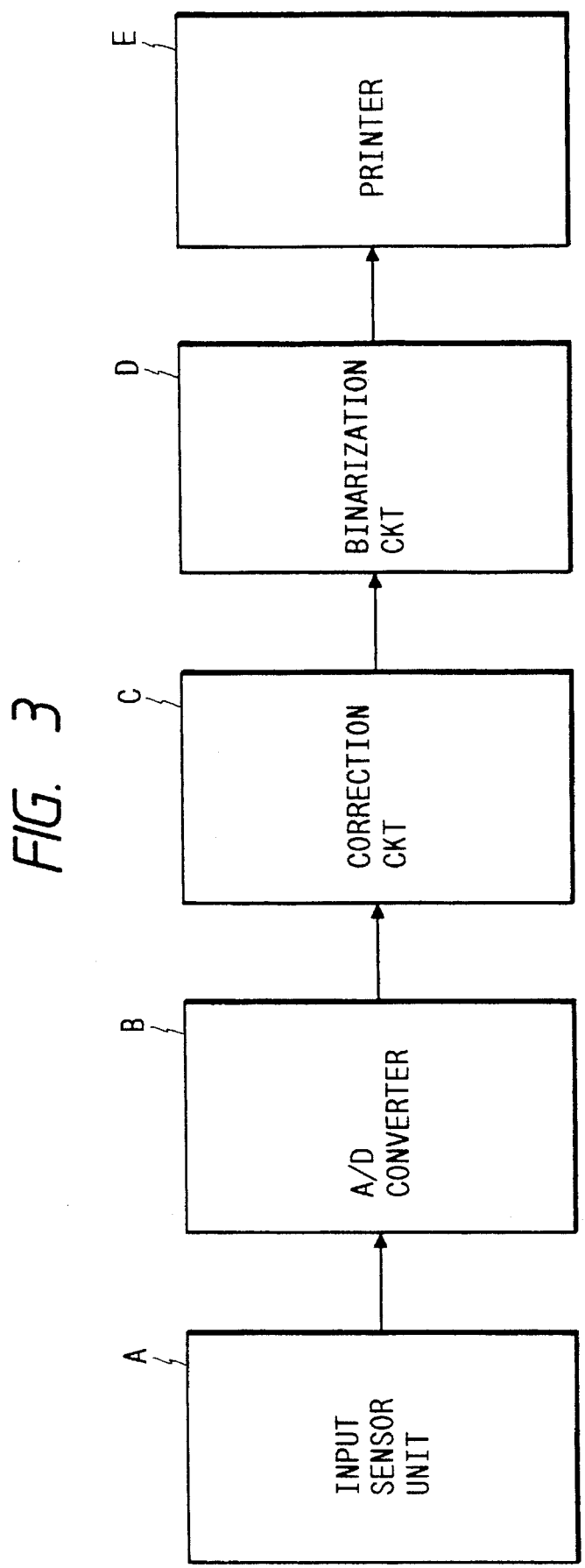

FIG. 6A

| 1/21 | 3/21 | 1/21 |
|------|------|------|
| 3/21 | 5/21 | 3/21 |
| 5/21 | 0    | 0    |

FIG. 6B

| 1/48 | 3/48 | 5/48 | 3/48 | 1/48 |
|------|------|------|------|------|
| 3/48 | 5/48 | 7/48 | 5/48 | 3/48 |
| 5/48 | 7/48 | 0    | 0    | 0    |

FIG. 8A

| f(i-2, j-2) | f(i-1, j-2) | f(i, j-2) | f(i+1, j-2) | f(i+2, j-2) |
|---|---|---|---|---|
| f(i-2, j-1) | f(i-1, j-1) | f(i, j-1) | f(i+1, j-1) | f(i+2, j-1) |
| f(i-2, j) | f(i-1, j) | f(i, j) | f(i+1, j) | f(i+2, j) |

FIG. 8B

| B(i-2, j-2) | B(i-1, j-2) | B(i, j-2) | B(i+1, j-2) | B(i+2, j-2) |
|---|---|---|---|---|
| B(i-2, j-1) | B(i-1, j-1) | B(i, j-1) | B(i+1, j-1) | B(i+2, j-1) |
| B(i-2, j) | B(i-1, j) | B(i, j) | | |

FIG. 8C

| R(-2, -2) | R(-1, -2) | R(0, -2) | R(+1, -2) | R(+2, -2) |
|---|---|---|---|---|
| R(-2, -1) | R(-1, -1) | R(0, -1) | R(+1, -1) | R(+2, -1) |
| R(-2, 0) | R(-1, 0) | R(0, 0) | R(+1, 0) | R(+2, 0) |

| INPUT | | | 13 | 14 | 15 | 16 |
|---|---|---|---|---|---|---|
| $2^1$ BIT POSITION | | | 0 | 1 | 1 | 0 |
| ADDI-TION VALUE | PN=1 | | +2 | -2 | -2 | +2 |
| | PN=0 | | 0 | 0 | 0 | 0 |

FIG. 16

| INPUT | | | | 13 | 14 | 15 | 16 |
|---|---|---|---|---|---|---|---|
| $2^0$ BIT POSITION | | | | 1 | 0 | 1 | 0 |
| $2^1$ BIT POSITION | | | | 0 | 1 | 1 | 0 |
| ADDI-TION VALUE | PN1 =1 | PN2 =1 | | +1 | -1 | -3 | +3 |
| | | PN2 =0 | | +2 | -2 | -2 | +2 |
| | PN0 =0 | PN2 =1 | | -1 | +1 | -1 | +1 |
| | | PN2 =0 | | 0 | 0 | 0 | 0 |

IMAGE PROCESSING APPARATUS

This application is a continuation of application Ser. No. 08/007,815 filed Jan. 22, 1993, which is a continuation of application Ser. No. 07/587,217 filed Sep. 24, 1990, both now abandoned.

BACKGROUND OF THE INVENTION

1. Field of the Invention

The present invention relates to an image processing apparatus for binary or multi-level digitization of image data, and more particularly to an image processing apparatus for intermediate tone processing of input image data.

2. Related Background Art

For intermediate tone processing in an image processing apparatus such as a facsimile apparatus or a digital copying machine, there are for example proposed an error dispersion method and an average density approximation method.

The former error dispersion method consists of, as disclosed by R. Floyd and L. Steinberg in Adaptive Algorithm for Spatial Gray Scale, SID 75 Digest, pp. 36–37, binary digitizing the multi-level image data of a contemplated pixel into a highest density level or a lowest density level, and adding the error between the thus binarized level and the multi-level image data prior to said binarization to the data of pixels in the vicinity of said contemplated pixel, with a predetermined weighting.

On the other hand, the latter average density approximation method consists of, as disclosed in the Japanese Patent Application Laid-open No. 57-104396, determining the weighted averages of the contemplated pixel and the pixels in the vicinity when said contemplated pixel is binary digitized to black or white, utilizing the binary data already digitized in the vicinity of said contemplated pixel, and binary digitizing the image data of the contemplated pixel, utilizing the average of said two average values as the threshold value.

The above-explained error dispersion method, being designed to correct the error between the input image data and the output image data, is capable of conserving the density of the input image in the output image processing apparatus, and thereby providing an image excellent in the resolving power and the tonal rendition.

However, the correction of the error between the input image data and the output image data requires a large amount of two-dimensional calculations, and the hardware structure becomes inevitably complex because of said amount of calculation.

On the other hand, the average density approximation method, in which the calculation is conducted with data after binary digitizing, is capable of simplifying the hardware structure and achieving a high-speed processing because of the limited amount of processing.

However, since the binary digitizing is conducted by approximation of the contemplated pixel to the average value of an area including said contemplated pixel, the number of tonal levels is limited, and a specific low-frequency texture is generated for an image showing gradual density change, whereby the image quality is deteriorated.

In consideration of the foregoing, the present applicant has proposed, as disclosed in U.S. patent application Ser. Nos. 476,766 and 476,618 (now U.S. Pat. No. 5,121,446) an average density conserving method consisting of determining a single average density, binary digitizing the image utilizing said average density as the threshold value, and adding a correction for the error in binary digitizing.

However, in binary digitizing of an input image with the above-mentioned error dispersion method or the average density conserving method, if the input image has a constant image density continuously over a wide images area as in computer graphic (CG) image, there will result a periodic pattern based on the error dispersing mask on the obtained binary image, or an extremely regular black-and-white pattern in a low or high density image area, so that the image quality is deteriorated.

SUMMARY OF THE INVENTION

In consideration of the foregoing drawbacks in the prior technology, an object of the present invention is to provide an image processing apparatus capable of providing an image, excellent in tonal rendition and resolving power, within a short time with a simple hardware structure.

Another object of the present invention is to provide an image processing apparatus capable, in digitizing input data with error dispersion, of preventing the formation of periodic patterns, thereby providing an output image of high quality.

The above-mentioned objects can be attained, according to an embodiment of the present invention, by an image processing apparatus comprising:

input means for entering image data of a contemplated pixel;

calculating means for determining the average density of a predetermined area utilizing binarized data;

binarizing means for binary digitizing the image data of said contemplated pixel, based on the average density obtained by said calculating means; and correction means for distributing the error generated in said binary digitization by said binarizing means to the input image data of plural pixels with a rate of distribution based on a predetermined signal, thereby correcting said error.

Also according to another embodiment of the present invention, there is provided an image processing apparatus comprising:

calculation means for calculating, from the already digitized data of a predetermined area, the average of said predetermined area;

digitization means for digitizing multi-level image data, based on the average obtained by said calculation means;

error dispersion means for dispersing the error generated in the digitization by said digitization means, to the multivalue image data of surrounding pixels; and random number generating means for generating pseudo random numbers;

wherein said error dispersion means is adapted to distribute said error to the multi-level image data of the surrounding pixels with a rate of distribution determined by said pseudo random numbers.

According to still another embodiment of the present invention, there is provided an image processing apparatus comprising:

calculation means for calculating, from the already digitized data of a predetermined area, the average of said predetermined area;

digitization means for digitizing multi-level image data based on the average obtained by said calculation means;

random number generating means for generating pseudo random numbers; and average correcting means for correcting said average based on said pseudo random numbers.

According to still another embodiment of the present invention, there is provided an image processing apparatus comprising:

input means for entering multi-level image data of a contemplated pixel;

calculation means for calculating, from the already digitized data of a predetermined area, the average of said predetermined area;

random number generating means for generating pseudo random numbers;

correction means for correcting the multi-level image data entered by said input means, based on said pseudo random numbers; and digitization means for digitizing multi-level image data corrected by said correction means, based on the average obtained by said calculation means.

Still another object of the present invention is to provide an image processing apparatus capable of realizing, in inexpensive and simple manner, a circuit for adding a small dither signal to the input image signal, thereby preventing the formation of a periodic pattern on the output image after digitization.

The above-mentioned object can be attained, according to an embodiment of the present invention, by an image processing apparatus comprising:

input means for entering multi-level image signal;

random number generating means for generating random numbers in synchronization with said input image signal;

calculation means for effecting logic calculation on the bit signal at a predetermined position of the image signal entered by said input means and the random number generated by said random number generating means;

output means for replacing the bit signal of said predetermined position with the result of calculation by said calculation means; and processing means for intermediate tone processing of the output signal from said output means into a binary signal.

The foregoing and still other objects of the present invention, and the features thereof, will become fully apparent from the following detailed description, which is to be taken in conjunction with the attached drawings.

BRIEF DESCRIPTION OF THE DRAWINGS

FIG. 1A is a view showing multi-level images in pixels in a first embodiment of the present invention;

FIG. 1B is a view showing binarized images in pixels in said first embodiment of the present invention;

FIG. 1C is a view showing weighting masks for pixels in said first embodiment;

FIG. 3 is a block diagram of an image processing apparatus constituting said first embodiment;

FIGS. 6A and 6B are views showing examples of a weighting mask;

FIGS. 8A to 8C are views showing the principle of the average error preserving method;

FIGS. 14 and 16 are views showing the relation between the random number (added value) PN and the input data.

DETAILED DESCRIPTION OF THE PREFERRED EMBODIMENTS

Now the present invention will be clarified in detail by embodiments thereof shown in the attached drawings. [1st embodiment]

At first reference is made to FIG. 1 for explaining the principle of an embodiment of the present invention.

FIG. 1A shows multi-level densities in multiple pixels in an input image.

In FIG. 1A, f(i, j) indicates the multi-level density data, normalized in a range from 0 to 1, of a contemplated pixel to be binary digitized. It is assumed that the pixels above the broken line are already subjected to binary digitization, and, the binary digitization will be conducted, after the contemplated pixel, in the order of f(i, j+1), f(i, j+2), . . . in succession.

FIG. 1B shows the binarized image data, wherein B(i, j) indicates the density "0" or "1" of the contemplated pixel, after binary digitization. The pixel data in the area surrounded by a broken line are already binary digitized before the processing of the contemplated pixel, and are utilized in the binary digitization of said contemplated pixel.

FIG. 1C shows a weighting mask. The illustrated mask R is an example of weighting mask for determining the average density, composed of a 3×3 matrix, wherein the weights for the undigitized pixel are R(0, 0)=R(0, −1)=0.

In the present embodiment, the weighted average density m(i, j) of binary image in the vicinity of the contemplated pixel is obtained by:

$$m(i,j) = \sum_{x=0}^{2} \sum_{y=-1}^{1} R(x, y) \cdot B(1-x, j-y) \quad (1)$$

The contemplated pixel f(i, j) is binary digitized according to the following equations (2), utilizing the above-mentioned average density m(i, j) and the already distributed correction value E(i, j) for binary digitization:

$$B(i,j) = 1 \text{ if } f(i,j) + E(i,j) > m(i,j)$$
$$B(i,j) = 0 \text{ if } f(i,j) + E(i,j) \leq m(i,j)$$
$$err = f(i,j) + E(i,j) - m(i,j)$$
$$e1(i, j+1) = K1 \times err$$
$$e2(i+1, j) = K2 \times err$$
$$e3(i+1, j+1) = K3 \times err$$
where
$$E(i,j) = e1(i,j) + e2(i,j) + e3(i,j)$$
$$K1 + K2 + K3 = 1$$

(2)

Figure 2A:
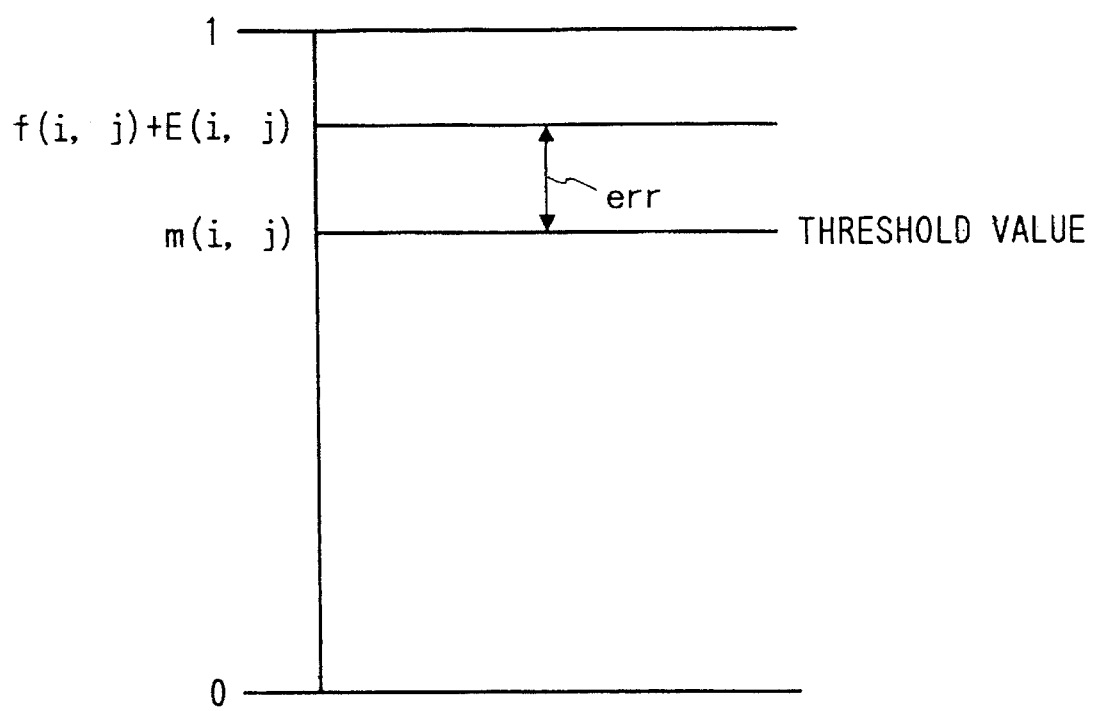
FIGS. 2A and 2B are charts showing the principle of binarizing process in the first embodiment.
Figure 2B:
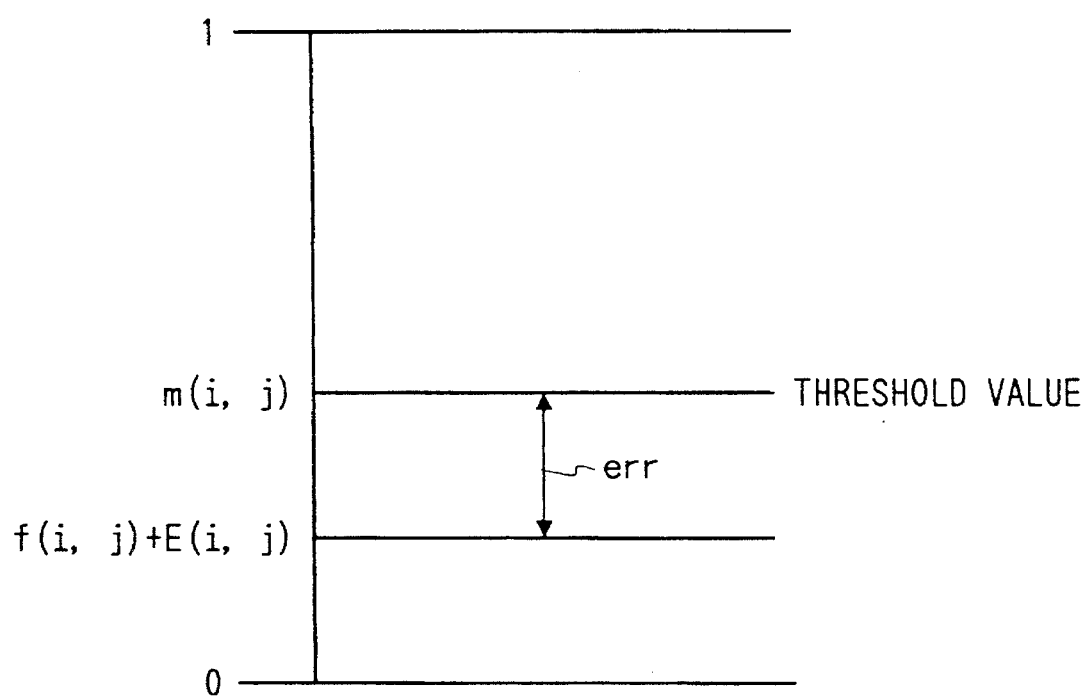

FIGS. 2A and 2B graphically illustrate the conditions represented by equations (2).

In said equations (2), E(i, j) is the sum of an error e1(i, j) generated in the binary digitization of a pixel (i, j–1) immediately preceding the contemplated pixel (i, j) from the multi-level density f(i, j–1) into a binary density F(i, j–1), an error e2(i, j) generated in the binary digitization of an adjacent pixel (i–1, j) in the preceding line from the multi-level density f(i–1, j) into a binary density B(i–1, j), and an error e3(i, j) generated in the binary digitization of a pixel (i–1, j–1) immediately preceding the above-mentioned pixel (i–1, j) from the multi-level density f(i–1, j–1) into a binary density f(i–1, j–1).

Thus, the image density can be completely conserved, in average density, over the entire input image after the binary digitization, by binary digitization of the contemplated pixel f(i, j) after the correction by addition of said binarizing error E(i, j).

The above-explained process taking the binarizing error into consideration significantly improves the ability for reproducing the intermediate tone, in comparison with the average density approximation method explained before.

Also in the foregoing equations (2), the distribution factors K1, K2 and K3 used for distributing the error among three adjacent pixels may be selected from ¼, ½ and ¼ in random manner for each pixel, for example according to a random number, whereby the formation of a periodic pattern on the binary image can be prevented.

The binary digitizing method of the present embodiment explained above has an image reproducing ability comparable to or larger than that of the conventional error dispersion method, in spite of a fact that the amount of data processing is significantly less than that in said error dispersion method. This is because the effect of this method is equivalent to the correction by distribution of the error into a large number of pixels, because of the use of average density based on the data of plural pixels after binary digitization, though in fact the above-mentioned error is corrected only among three pixels.

Also, the process of the present embodiment is capable of disrupting the periodicity of the error correcting procedure by distributing the error err, generated between the above-mentioned average density and the input data, to the data of plural pixels with randomly varying distribution factors, instead of constant distribution factors. It is therefore possible to prevent the deterioration in the image quality, resulting from formation of specific low-frequency texture.

FIG. 3 is a block diagram of the image processing apparatus of the present embodiment.

Referring to FIG. 3, an input sensor unit A, for reading an original image, is composed of a photoelectric converting device such as a CCD and a driving device therefor, and the image data of the original image read by said input sensor unit A are transmitted in succession to an A/D converter B.

Said A/D converter B digitizes the data of each pixel into 8-bit digital data, with 256 tonal levels. A next correction circuit C effects digital calculations such as shading correction for compensating for the unevenness in sensitivity of the CCD of the input sensor unit A and in intensity of an illuminating light source.

The data corrected in the correction circuit C are supplied to a binarization circuit D, which digitizes the 8-bit multi-level image data into 1-bit binary data according to the above-explained process of the present embodiment.

A printer E, composed of a laser beam printer or an ink jet printer, reproduces the read image on a recording sheet by on/off control of printed dots according to the binary data supplied from the binarization circuit D.

Figure 4:
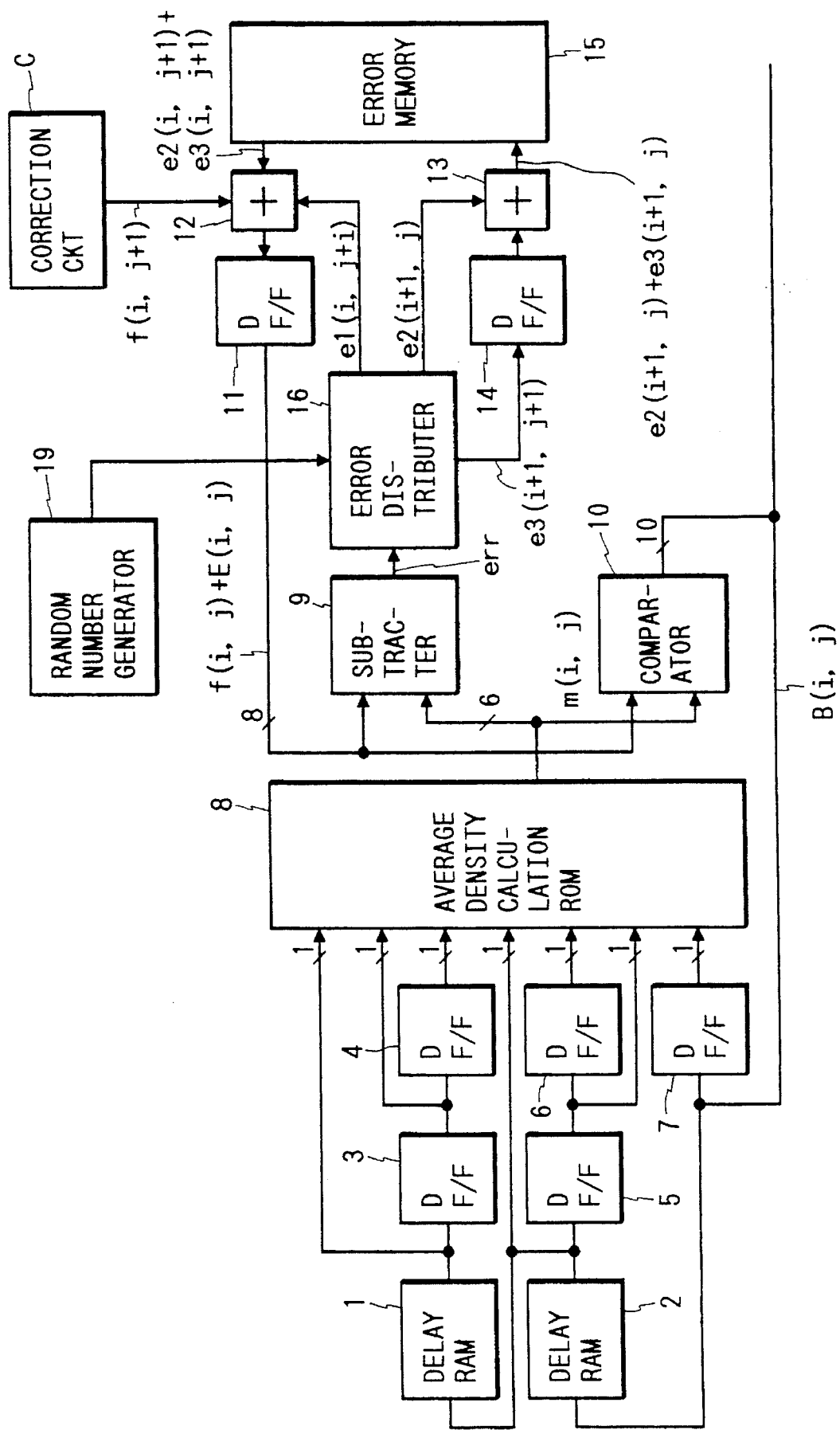
FIG. 4 is a detailed block diagram of a binarizing circuit in said first embodiment.

FIG. 4 is a detailed circuit diagram of the binarization circuit D shown in FIG. 3.

In FIG. 4 there are shown delaying RAM's 1, 2 each capable of storing binarized data of a line; D-type flip-flops (DF/F) 3–7 and 11 for respectively delaying the binary data and the multi-level data by a pixel; an average density calculating ROM 8 for calculating the average density of a predetermined area from the binary data of pixels in the vicinity of the contemplated pixel and releasing said average density as the threshold value for binary digitization of the data of said contemplated pixel; a subtracter 9 for calculating the difference err between the input multi-level data of the contemplated pixel and the threshold value supplied from said average density calculating ROM 8; a comparator 10 for comparing the input multi-level data of the contemplated pixel and the threshold value supplied from said average density calculating ROM 8; an adder 12 for adding a distributed error e1 released from an error distributor 16 and input data released from the correction circuit C to the output of an error memory 15; an adder 13 for adding an error e3 delayed by a pixel in a D-flip-flop 14 to a distributed error e2 released from the error distributor 16; a D-flip-flop 14 for delaying, by a pixel, the distributed error e3 released from the error distributor 16; an error memory 15 for delaying the error e2+e3 obtained in the adder 13 by about a line; an error distributor 16 for distributing the error err released from the subtracter 9 to three pixels; and a random number generator 19 for controlling the error distribution factor of the error distributor 16.

In the above-explained circuit structure, the comparator 10 releases a binary 1-bit signal B(i, j) according to the equations (2). Said binary signal is supplied to the RAM 2 for a line delay. The binary signal B(i–1, j+1) delayed by a line in said RAM 2 is further supplied to the RAM 1, and a binary signal B(i–2, j+1) delayed by two lines in said RAM's 2, 1 is supplied to the average density calculating ROM 8.

Also, the average density calculating ROM 8 is given a signal B(i–2, j) by the DF/F 3, B(i–2, j–1) by DF/F 4, B(i–1, j) by DF/F 5, B(i–1, j–1) by DF/F 6 and B(i, j–1) by DF/F 7.

These binary signals represent binary image data of the pixels surrounding the contemplated pixel (i, j) as shown in FIG. 1. As the average density calculating ROM 8 incorporates the equations 1 (1) and (2), the binarizing threshold value m(i, j) can be obtained promptly by supplying these signals to input address lines of said ROM 8.

Said threshold value is supplied to the subtracter 9 and the comparator 10.

On the other hand, said subtracter 9 and the comparator 10 are given f(i, j)+E(i, j) by the DF/F 11.

From these two inputs, the subtracter 9 calculates, according to one of the equations (2):

$$err=f(i, j)+E(i, j)-m(i, j) \qquad (3).$$

Also based on these two inputs, the comparator 10 compares $f(i,j)+E(i,j)$ with $m(i,j)$ and releases the binary signal $B(i, j)$.

Also, the error err obtained in the subtracter 9 according to the equation (3) is supplied to the error distributor 16.

The error distributor 16 generates three distributed errors e1, e2 and e3 in the equations (2), in response to a 2-bit random number signal released from the random number generator 19.

The DF/F 14 delays the error $e3(i+1, j+1)$ by a pixel and releases $e3(i+1, j)$ which is added to the error $e2(i+1, j)$ of the same position by the adder 13.

The obtained sum is stored in the error memory 15, and a value $e2(i, j+1)+e3(i, j+1)$, preceding by a period corresponding to a line minus a pixel, is read from said memory and added, together with the distributed error $e1(i, j+1)$ of the same position, to the input data $f(i, j+1)$ in the adder 12. The error correction is completed in this manner.

The binary digitization is thereafter conducted in succession, by repeating the above-explained sequence.

Figure 5:
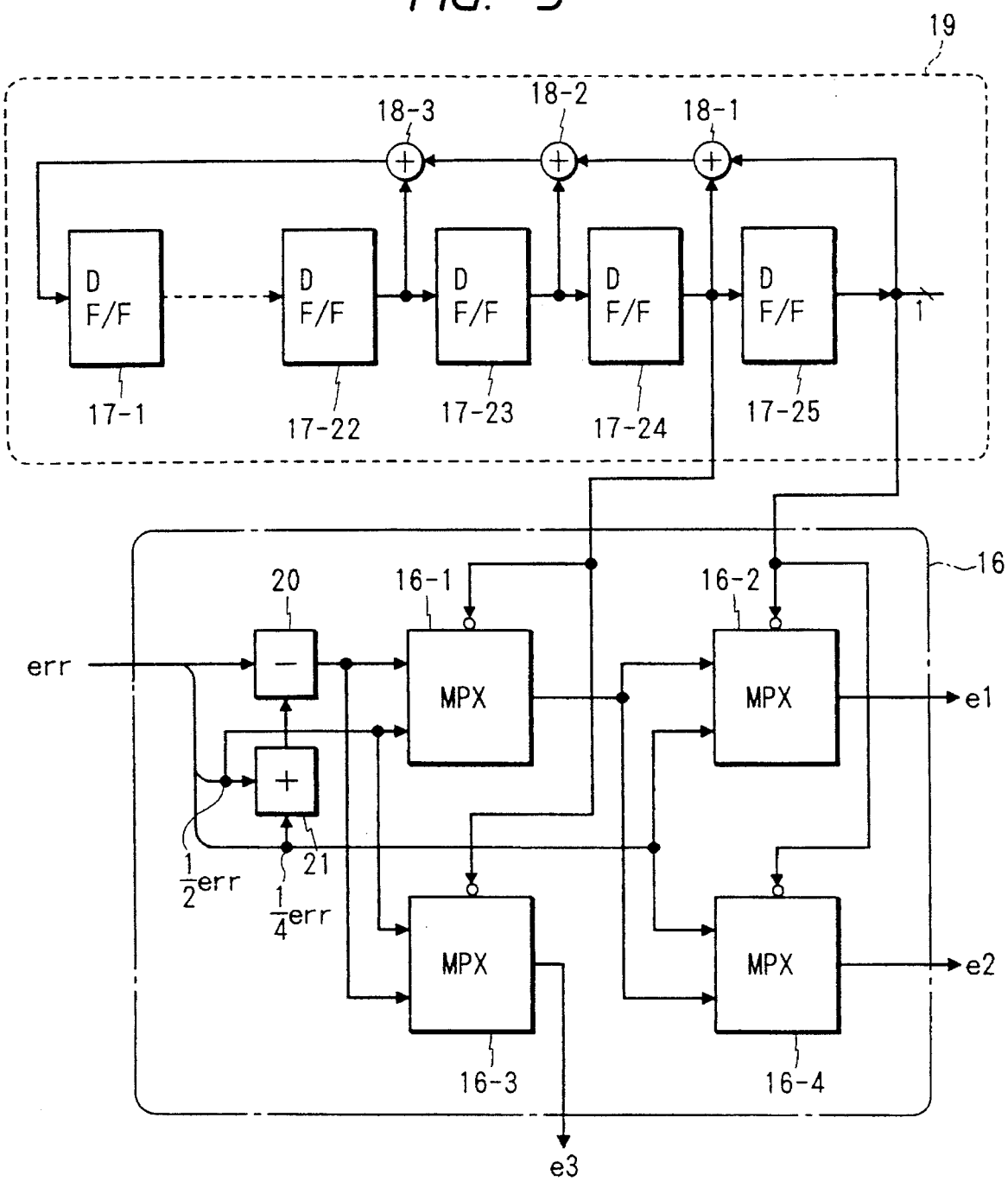
FIG. 5 is a detailed circuit diagram of an error distributor and a random number generator shown in FIG. 4.

FIG. 5 shows the details of the random number generator 19 and the error distributor 16 employed in the present embodiment.

The random number generator 19, shown in the upper part of FIG. 5, is composed of twenty-five DF/F's 17-1–17-25 and three exclusive OR gates EX-OR 18-1, 2, 3. Said DF/F's constitute a so-called M-series code generator in which output signals of said DF/F's cannot all assume "0" at the same time by an unrepresented preset circuit, and provide pseudo random numbers with a period of $2^{25}-1$.

In the present embodiment there are employed 2-bit signals composed of the output of the DF/F 17-25 and that of the preceding DF/F 17-24.

On the other hand, the error distributor 16 shown in the lower part is composed of four multiplexers 16-1, 16-2, 16-3 and 16-4, a subtracter 20 and an adder 21.

Based on the error err supplied to said error distributor 16, there are determined err/2 and err/4 by bit shift. The err/2 is supplied to the multiplexers 16-1 and 16-3, while the err/4 is supplied to the adder 21 and the multiplexers 16-2 and 16-4.

The adder 21 adds err/2 and err/4, and sends the sum to the subtracter 20. The subtracter 20 calculates:

$$err-(err/2+err/4)$$

thereby obtaining a distributed error ¼ err, approximately corresponding to err/4 and free from error in calculation. Said distributed error ¼ err is supplied to the multiplexers 16-1 and 16-3.

Thus err/2 or distributed error ¼ err is selected from the outputs of the multiplexers 16-1 and 16-3 according to the output signal of the DF/F 17-24 of the random number generator 19, and also err/2, distributed error ¼ err or err/4 is selected from the output of the multiplexers 16-2, 16-4 according to the output signal of the DF/F 17-25 of the random number generator 19.

Therefore, the distribution factors e1, e2 and e3 can assume six different combinations in random manner, by two-bit random numbers.

FIGS. 6A and 6B show examples of the weighting mask employed in the present embodiment.

The weighting mask shown in FIG. 6A is to obtain the average value from binary data of seven pixels in the vicinity, while that in FIG. 6B is to obtain the average from binary data of 12 pixels in the vicinity.

The present embodiment employs the weighting mask 1 shown in FIG. 6A, and, for the purpose of normalization matching the 6-bit levels (0–63) of the actually entered image density, the table of the average density calculating ROM 8 stores values obtained by multiplying the values according to the equation (1) by 63.

The weighting mask shown in FIG. 6B may be used in the same manner by storing, in the table of the average density calculating ROM 8, appropriate values based on the equation (1).

The present embodiment, as explained above, allows to reduce the amount of data processing in comparison with that in the conventional average density approximation method, as the average density is calculated solely from the data of the pixels already subjected to binary digitization and said average density is used as the threshold value in the binary digitization of the input multi-level data.

Also, the error correction in three pixels can be achieved with an extremely simple hardware, because the distribution factors are limited to ¼ and ½ obtainable by bit shift operations. Furthermore, the random change of the error distribution to said three pixels enables binary digitization without the defect of periodic texture formation specific to such binary digitizing methods.

It is also possible to distribute the error to a larger number of two-dimensionally nearby pixels with predetermined distribution factors as in the case of error dispersion method. In such case, though the hardware structure becomes somewhat complex, but the image reproduction characteristic is improved as the image uniformity is improved not only in the main scanning direction but in the sub scanning direction.

In the present embodiment, the values of the weighting mask are made larger as the position of the pixel is closer to the contemplated pixel, but the gradation and distribution of said values are not limitative. There may also be employed scattered pixels not directly adjoining to the contemplated pixel.

In the above-explained embodiment, non-zero values are distributed to three pixels for error correction, but the present invention is not limited by such embodiment. As an example, the error distribution may be conducted in the following manner.

For example, the error is distributed with distribution factors ½, ½ in randomly selected two positions out of three positions $(i, j+1)$, $(i+1, j)$ and $(i+1, j+1)$, namely the positions $(i, j+1)$ and $(i+1, j)$, or $(i, j+1)$ and $(i+1, j+1)$, or $(i+1, j+1)$ and $(i+1, j)$. In this manner there can be securely prevented the deterioration of image quality by the formation of low-frequency texture or the periodicity in the binary image resulting from that of the error dispersion mask, even for an original image with gradual density change.

In the foregoing embodiment a random number generator is employed for preventing the formation of low-frequency texture or the like, but the present invention is not limited to such embodiment utilizing the random number generator. For example the prevention of formation of low-frequency texture or the like can be satisfactorily achieved by the use of the lower two bits of multilevel data, namely $f(i, j)+E(i, j)$, after the correction of the contemplated pixel.

[2nd embodiment]

In the foregoing 1st embodiment, a high-quality reproduced image without periodic pattern is obtained by random change of the distribution factors of the error generated in the binary digitization of the contemplated pixel.

In the present second embodiment, a high-quality reproduced image is obtained by correction, based on random numbers, of the threshold value (average density m) for binary digitization or the input data to be subjected to binary digitization.

Figure 7:
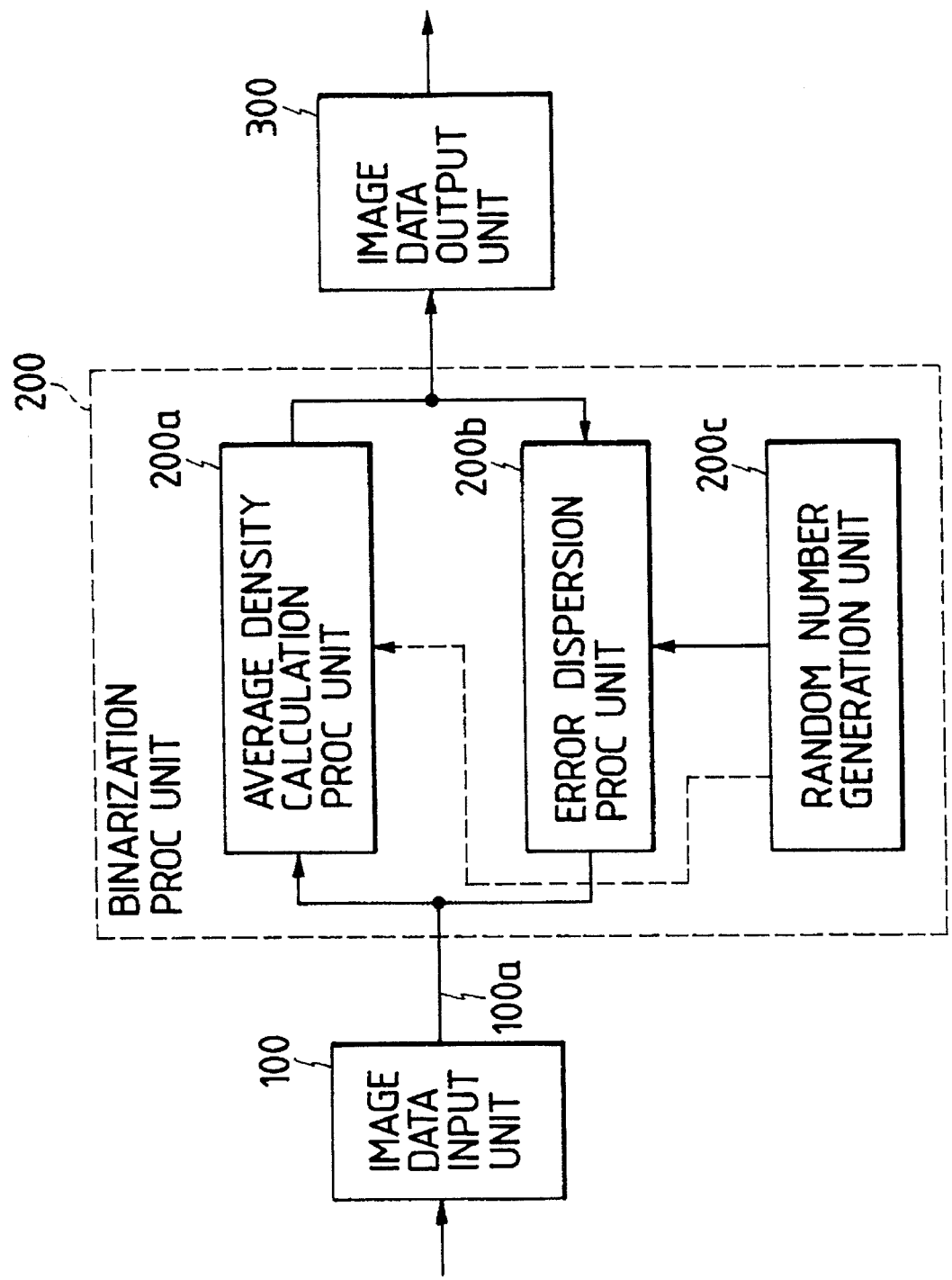
FIG. 7 is a block diagram of an image processing apparatus constituting a second embodiment.

FIG. 7 is a block diagram of the image processing apparatus of the 2nd embodiment.

Multi-level image data 100a, such as image data read from an original image, supplied from an image data input unit 100 are binary digitized, with a pseudo intermediate tone process, in a binarization process unit 200, and are released as a display or a print in an image data output unit 300. The binarization process unit 200 effects a process based on the average density conserving method, integrally by an average density calculation unit 200a for determining the average density as the threshold value for binary digitization and an error dispersion unit 200b for error correction, as will be detailedly explained in the following.

In the present embodiment, the binarization process unit 200 further has a random number generation unit 200c, and the formation of periodic pattern in the result of binarization is prevented by random numbers generated by said unit 200c.

In the following there will be explained the principle of the average density conserving method with reference to FIGS. 8A to 8C, though it was already briefly explained with reference to FIGS. 1A to 1C. The average density determining area in FIGS. 8A–8C is selected to be wider than that in FIGS. 1A–1C.

In this method, in a case of binary digitizing the input multi-level data f(i, j)(0–255) shown in FIG. 8A, a weighted average m(i, j) is determined from binary data B(i, j) of plural pixels present in the vicinity and already subjected to binarization as shown in FIG. 8B, and from a weighting mask R(x, y) prepared in advance as shown in FIG. 8C. Said average m(i, j) is used as the threshold value for binary digitization, and the input multi-level data of the neighboring pixels to be hereafter subjected to binary digitization are corrected by the difference between said average m(i, j) and the input image data f(i, j), whereby the density is conserved.

In an example shown in FIGS. 8A to 8C, there are employed following relations:

$$m(i,j) = \sum_{x=-2}^{2} \sum_{y=-2}^{0} R(x, y) \times B(i+x, j+y) \quad (4)$$

$B(i, j)=1$ if $f(i, j)+E(i, j)>m(i, j)$ $B(i, j)=0$ if $f(i, j)+E(i, j) \leq m(i, j)$ $E_1(i, j+1)=\frac{1}{2}[f(i, j)+E(i, j)-m(i, j)] \quad (5)$ wherein $E(i, j)=E_1(i, j)+E_2(i, j) \quad (6)$ The principle of this method will be explained further in the following, with reference to FIG. 9.

Figure 9:
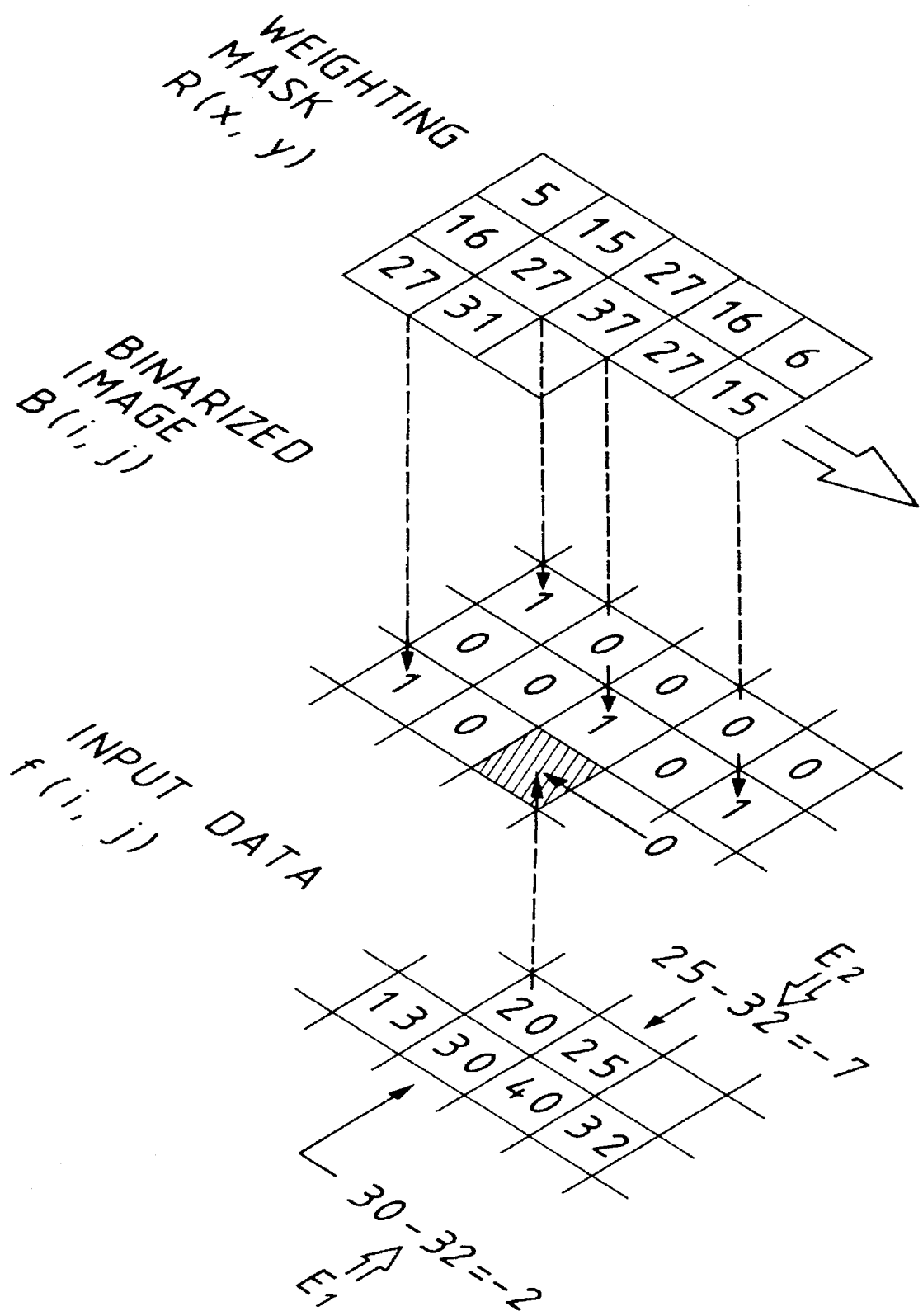
FIG. 9 is a view showing the principle of average density calculation.

The weighting mask employed is so designed to have a total of 255 for 12 pixels in the vicinity of the contemplated pixel, as shown in FIG. 9. Consequently the average m(i, j) can be directly used as the threshold value in a range 0–255, for the binary digitization. For digitizing the multi-level data "20" in the contemplated pixel shown in FIG. 9, the threshold value m(i, j) can be calculated in the following manner, based on the illustrated binary data B(i, j):

$$\begin{aligned}m(i,j) = &\ (37 \times 0 + 27 \times 1) + (16 \times 0 + 27 \times 0 + \\ &\ 37 \times 1 + 27 \times 0 + 15 \times 1) + (6 \times 0 + 16 \times \\ &\ 0 + 27 \times 0 + 15 \times 0 + 5 \times 1)\end{aligned}$$

Consequently the binary digitization results as B(i, j)=0, with an error 20−84=−64, whereby $E_1(i, j+1)=E_2(i+1, j)=-32$.

This error dispersion results in a correction of f(i+1, j) from 25 to 25−32=−7, and a correction of f(i, j+1) from 30 to 30−32=−2.

In the present embodiment, a dither signal $P_N(i, j)$ is added according to the output of a pseudo random number generator at the binary digitization according to the equation (5), in order to prevent the formation unnatural periodic texture on the binary image, encountered in case a uniform area with same multi-level data is binarized, for example when the above-explained process is applied to a multi-level image such as a computer graphic output.

Therefore the foregoing equations (5) and (6) become:

$$\left.\begin{aligned}B(i,j) &= 1 \quad \text{if } f(i,j)+E(i,j)+P_N(i,j) > m(i,j) \\ B(i,j) &= 0 \quad \text{if } f(i,j)+E(i,j)+P_N(i,j) \leq m(i,j)\end{aligned}\right\} \quad (7)$$

$$\left.\begin{aligned}E_1(i, j+1) &= 1/2\{f(i,j)+E(i,j)+P_N(i,j)- \\ & \quad m(i,j)\} = E_2(i+1, j) \\ \text{wherein} & \\ E(i,j) &= E_1(i,j)+E_2(i,j)\end{aligned}\right\} \quad (8)$$

The pseudo random number generator employed in the present embodiment utilizes already known M-series codes (S. W. Golomb, "Shift-Register Sequences" Holder-Day, Inc., San Francisco, 1967). In order to prevent formation of periodic texture when an A4-sized original is processed with a density of 400 dpi, there is employed a cycle of $2^{25}-1$, and a density difference of $\pm \delta$ ($\delta$ being 2–4 levels) corresponding to 0 and 1 of 1-bit output of said generator.

Figure 10:
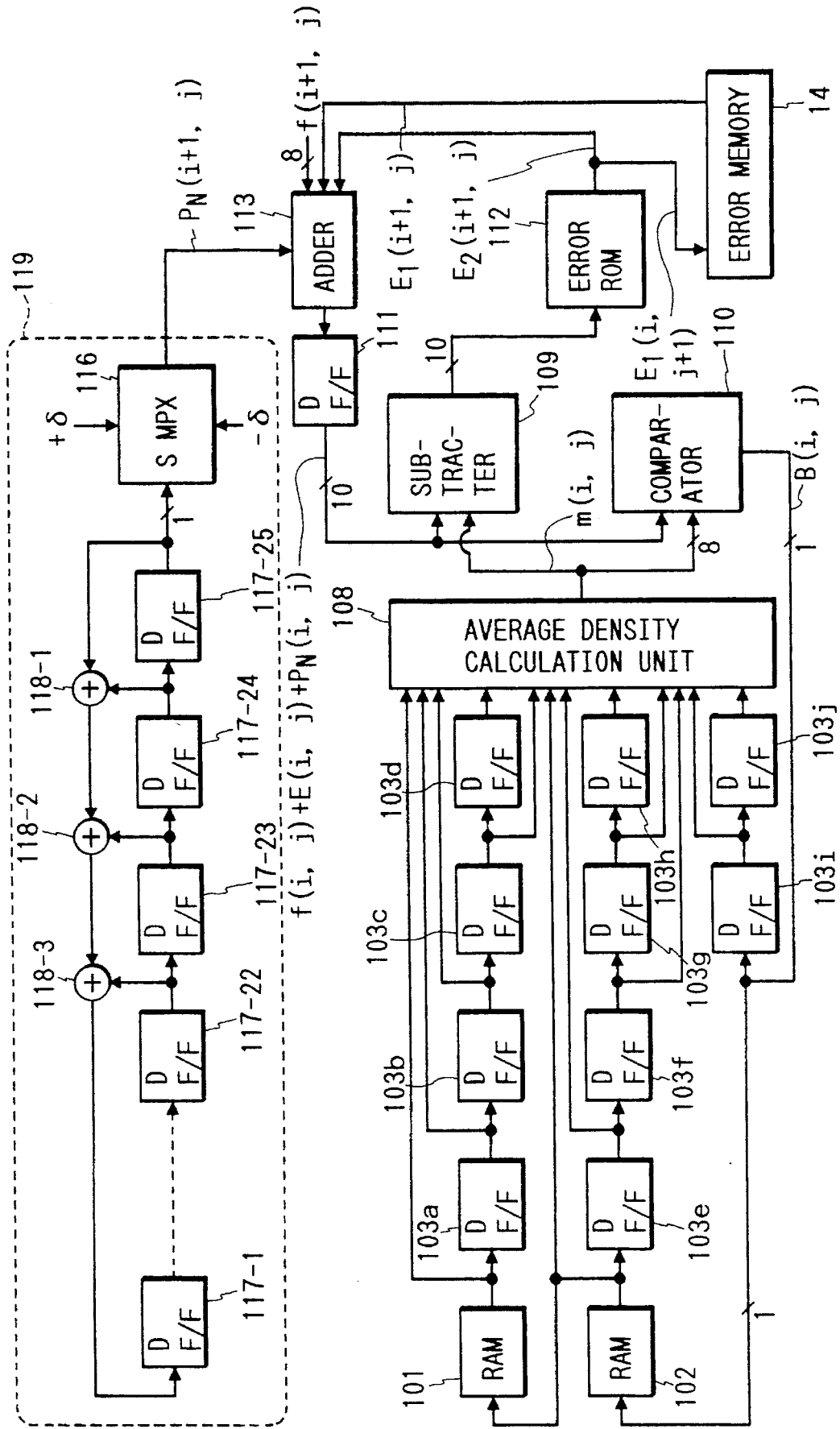
FIGS. 10 and 11 are views showing the hardware structure of a binarization unit in the second embodiment.

FIG. 10 shows the detailed hardware structure of the binarization process unit of the present embodiment.

At first the data binarized in a comparator 110 are supplied to a D-flip-flop (DF/F) 103i and a line memory 102, and are subsequently shifted through ten DF/F's 103a–103j and a line memory 101, whereby 12 binary data of the weighting mask area shown in FIG. 9 are simultaneously obtained from respective output terminals.

An average density calculating unit 108, receiving said data, may be composed of a ROM storing the average density calculated in advance by the weighting mask according to the equation (4), whereby the average m(i, j) can be obtained by table conversion. Said average is supplied as the threshold value to an input terminal of said comparator 110, and the subtraction according to the equation (8) is conducted by a subtracter 109. The output of said subtracter 109 is supplied to an error ROM 112 and is divided therein into $E_1$ and $E_2$ according to the equation (8). $E_1(i,j)$ is supplied to an error memory 114 and retained therein for a period approximately corresponding to a line, until the binary digitization of the next line. On the other hand, $E_2(i+1, j)$ is supplied to an adder 113, together with $E_1(i+1, j)$ released from the error memory 114 after delay of a line, there correcting the input data f(i+1, j).

A pseudo random number generator 119, indicated by a broken-lined frame, is composed of twenty-five 1-bit input/output DF/F's 117-1–117-25, three exclusive OR gates 118-1, 118-2, 118-3 and a multiplexer 116. The outputs of said DF/F's cannot simultaneously assume a state "0" by an unrepresented presetting circuit, so that M-series codes of a cycle $T=2^{25}-1$ are obtained at the output terminal of the DF/F 117-25. The multiplexer 116 converts "0" and "1" of the pseudo random number into predetermined $\pm\delta$ ($\pm 2-\pm 4$ in the present embodiment), and the converted value is added, in the adder 113, to $f(i+1, j)$ together with the correction data.

This random number generator adds dither signals of zero average level to the input image, without periodicity in the binary digitization of A4-sized image. Thus the average density of the image is not affected, and a binary image without periodicity can be obtained particularly when a computer graphic image having uniform areas with constant density level is digitized. The data corrected with said random number are synchronized in the DF/F 111 and supplied to the subtracter 9 and the comparator 10, whereby the binary digitization of the next pixel is conducted.

The above-mentioned process is repeated for each pixel, in synchronization with a pixel clock signal supplied to all the flip-flops.

In the foregoing embodiment, the dither signal $_{PN}$ of $\pm\delta$ based on the random number is added to the input image data, but it may also be added to the threshold value $m(i, j)$, corresponding to the transfer of $PN(i, j)$ to the right-hand term of the condition in (7).

Figure 11:
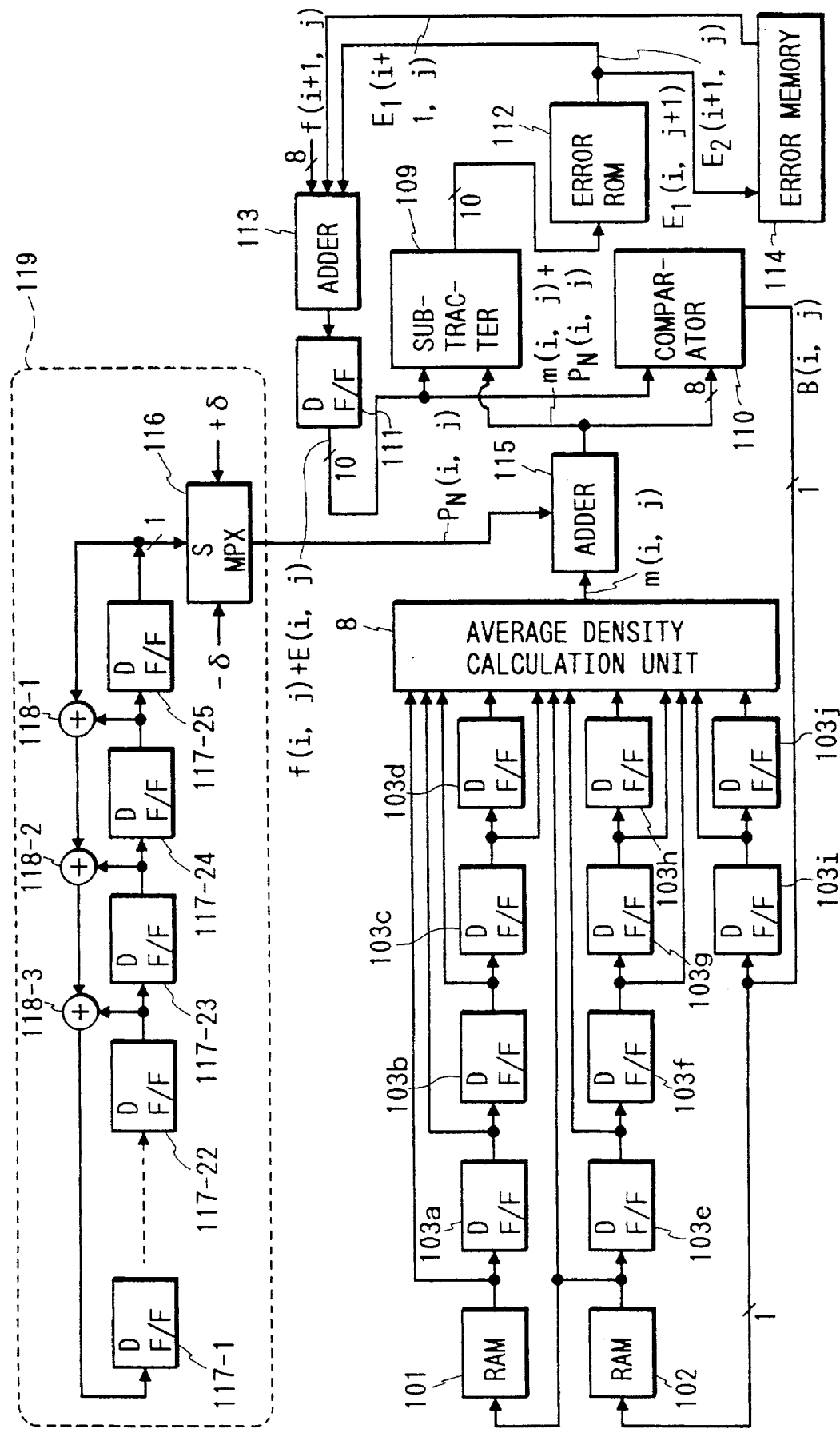

FIG. 11 shows an embodiment of adding PN to said threshold value, wherein the output dither signal PN from a pseudo random number generator 119 similar to that in the foregoing embodiment is added by an adder 115 to the average density $m(i, j)$. This embodiment has an advantage of alleviating the burden of the aforementioned adder 113.

The amplitude $\delta$ of the dither signal may be made smaller as the input data f become smaller, whereby the dot variation caused by said random number may be made constant in relative manner, regardless of the image density.

Also in the present embodiment, the cycle of random numbers is taken as large as $T=2^{25}-1$ in comparison with the amount of data in an A4-sized original image, but it is also possible to reduce the magnitude of hardware by selecting a shorter cycle such as $T=2^{10}-1$ and to extend said cycle in pseudo manner by presetting the DF/F's 17 in the course of binary digitization with other data, such as the absolute address of the contemplated address or the multi-level image data themselves.

As explained in the foregoing, the 1st and 2nd embodiments provide an image processing apparatus capable of reproducing a high-quality binary image without periodic pattern, even from an image having uniform density level over a wide area, such as a computer graphic image.

Thus there is provided an apparatus for pseudo intermediate tone process, capable of attaining higher image quality in comparison with the image quality of the conventional methods, despite of the limited hardware size of the apparatus. Also a binary image without periodicity can be obtained from a computer graphic image, by the addition of simple pseudo random numbers.

[3rd embodiment]

In the foregoing 1st and 2nd embodiments, there has been explained the prevention of formation of periodic pattern in the binarized image, with reference to the average density conserving method.

As a 3rd embodiment, there will be explained the addition of dither signals to the input data by addition of a simple hardware also for other intermediate tone processing methods, for preventing the formation of periodic pattern.

Figure 12:
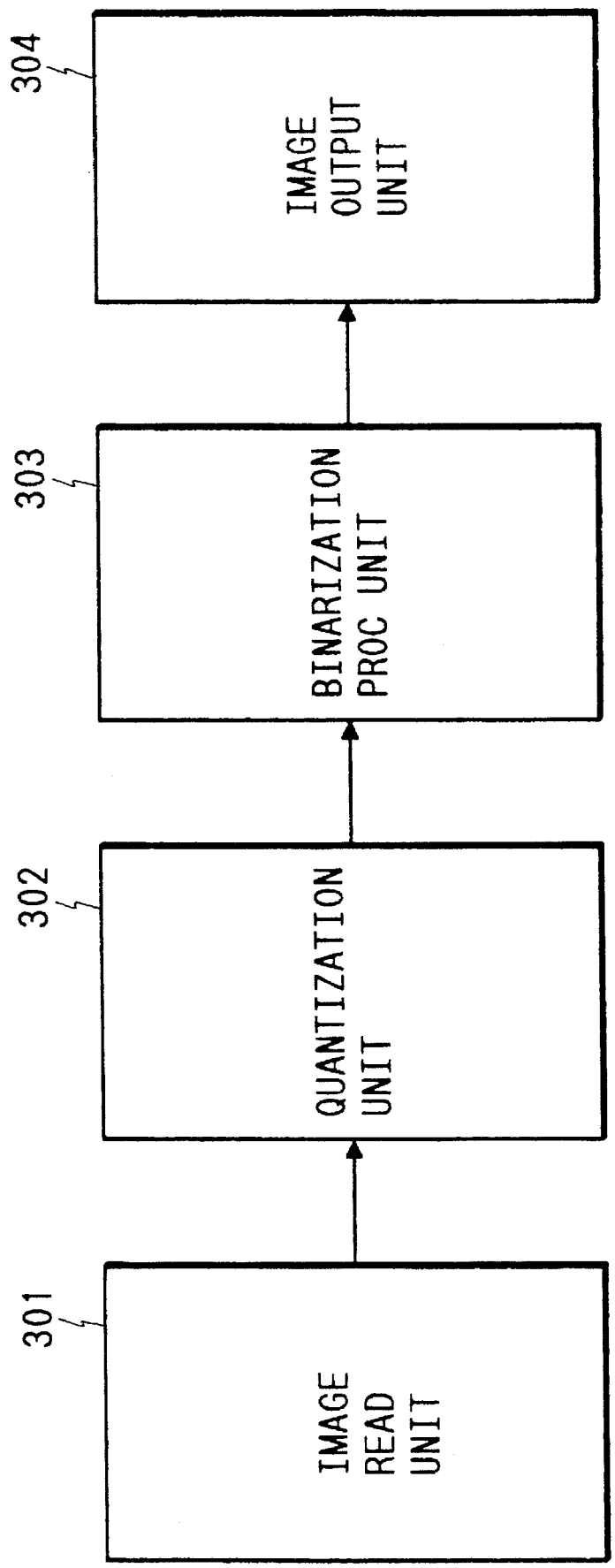
FIG. 12 is a block diagram of an image processing apparatus constituting a third embodiment.

FIG. 12 is a block diagram of a third embodiment of the present invention, wherein provided are an image reader unit 301 for reading an original image; a digitization unit 302 for converting the analog image signal read by the image reader unit 301 into a digital signal and thereafter applying known corrections such as logarithmic conversion and shading correction; a binarization unit 303 for effecting the binary digitization process of the present embodiment on the image data from the digitization unit 302; and an image output unit 304 for generating a visible image based on the binary image signal from the binarization unit 303.

In the following there will be explained the binary digitization process of the present embodiment. In the present embodiment, in 8-bit input image data a $2^{2n}$-th bit position alone is subjected to a logic calculation with a small dither signal, and pseudo-gradation processing is conducted after such addition of the dither signal.

Figure 13:
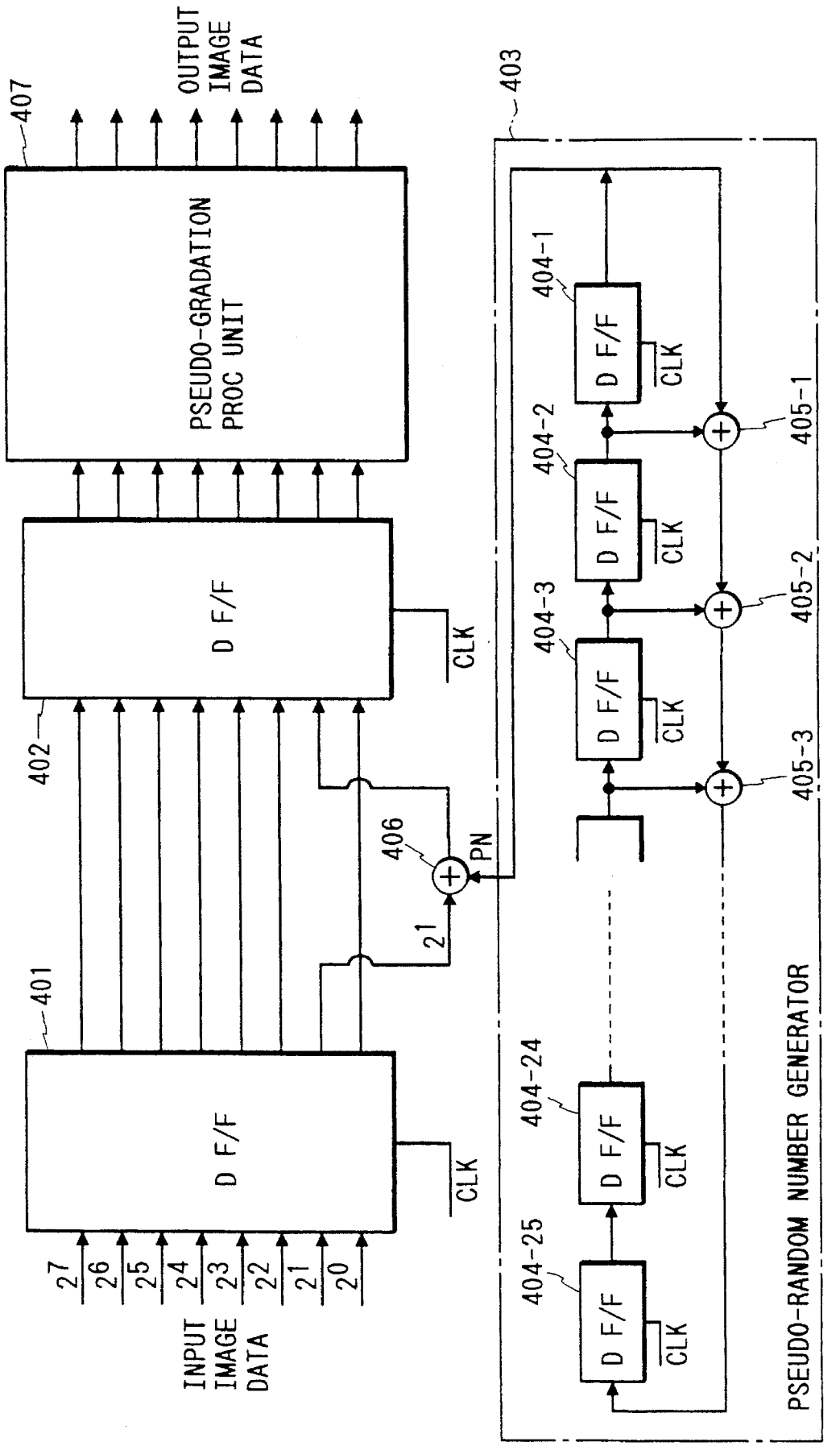
FIGS. 13 and 15 are block diagrams showing the structure of a binarization unit in the third embodiment.

FIG. 13 is a block diagram showing the internal structure of the binarization unit 303 of the present embodiment, wherein are provided D-flip-flops (DF/F) 404-1–404-25 for respectively delaying a 1-bit signal for a cycle time of unrepresented image clock signal; exclusive OR gates 405-1–405-3 for effecting an exclusive summing operation for the 1-bit signals delayed by said DF/F's 404-1–404-25; an M-series pseudo random number generator 403 for generating a small dither signal or a random number PN of one bit to be added by the DF/F's 404-1–404-25 and exclusive OR gates 405-1, 405-2, 405-3, DF/F's 401, 402 for holding 8-bit data before and after the logic calculation in the pseudo random number generator 403; an exclusive OR gate 406 for an exclusive summing operation of the bit signal of $2^1$-bit position supplied from the DF/F 401 and the random number from the pseudo random number generator 403, said gate 406 supplying a binary signal to a pseudo gradation process unit 407 to be explained later; and a pseudo gradation process unit 407 for converting 8-bit data, supplied from the DF/F 402, into a gradation image.

Said gradation process unit 407 can be based on the average density conserving method explained in the 1st and 2nd embodiments (namely the structure of FIG. 4 excluding the random number generator 19), or on the known error dispersing method.

8-bit data from said pseudo gradation process unit 407 are supplied, as output image data, to the image output unit 304 explained before.

In the following there will be explained the function of the binarization process unit 303 mentioned above.

In the pseudo random number generator 403, the exclusive logic sums released from the DF/F's 404-1, 404-2, 404-3, 404-4 are fed back to the input side of the DF/F 404-25, whereby 1-bit random numbers PN with a cycle of $2^{25}-1$ are obtained from the output terminal of the DF/F 404-1. As the cycle of the random numbers PN corresponds to the number of all the image data constituting an A4-sized original with a density of 400 dpi, said random numbers PN do not have periodicity within the A4-sized image. Said random number PN is subjected to an exclusive logic summing in the exclusive OR gate 406 with the image signal of the $2^1$-bit position in the 8-bit input image data, and the result of said logic calculation is supplied, as the image signal of $2^1$-bit position including the random dither signal, to the input terminal of the corresponding bit position of the DF/F 402.

If the signal at $2^1$-bit position of the input image data is "1" and the random number PN is "1", the output signal at said $2^1$-bit position becomes "0". In this case, therefore, a random number "−2" is added to the $2^1$-bit position of the input image data. On the other hand, if the signal at the $2^1$-bit position is "0" and the random number PN is "1", the signal at said $2^1$-bit position is changed from "0" to "1". In this case a random number "+2" is added to the $2^1$-bit position of the input image data. If the random number PN is "0", the input image signal is released without change, so that the added random number PN is "0".

FIG. 14 shows the relation between the input data and the added random number PN.

As shown in FIG. 14, an input image signal "13" is modified by a dither process to 13+2=15 if PN=1, or to 13+0=13 if PN=0. On the other hand, an input image signal "14" is processed to 14−2=12 if PN=1, or to 14+0=14 if PN=0. Similarly an input image signal "15" is processed in the same manner as the signal "14", and an input image signal "16" is processed in the same manner as the signal "13". In the present embodiment, as the number of "0" and that of "1" are equal due to the use of the M-series random numbers, the probabilities of appearance of "0" and "1" in the $2^1$-bit position in the input image data are not much different, so that the dither process can be achieved with a simple structure.

As explained in the foregoing, the 3rd embodiment can realize a circuit for adding a small dither signal with a more inexpensive and simpler manner. Therefore the resulting binary image is of high quality, without periodic pattern.

In the foregoing 3rd embodiment, the dither signal (random number PN) is added to the $2^1$-bit position, but it is also possible additionally to add a small dither signal to the image signal at the $2^0$-bit position, in order to obtain more delicate data.

In the following there will be explained still another embodiment, in which the same components as those in FIG. 13 are represented by the same numbers and will not be explained further.

Figure 15:
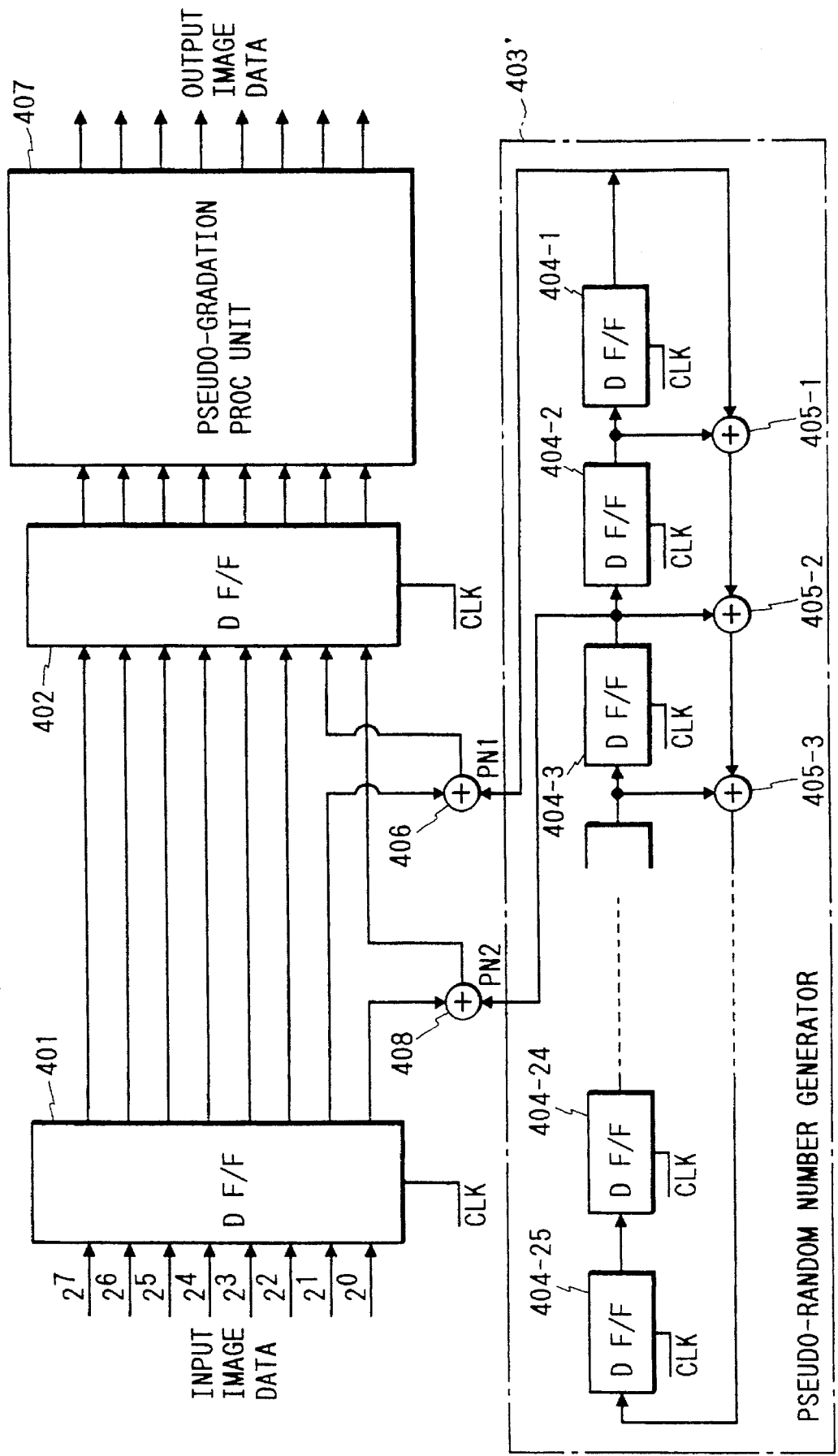

FIG. 15 is a block diagram showing the internal structure of the binarization process unit of said embodiment, wherein an exclusive OR gate 408 receives random numbers PN2, different in phase from random numbers PN1 released from the DF/F 404-1 of an M-series pseudo random number generator 403', from the DF/F 404-3, effects exclusive logic summing on said random number PN2 and the signal at $2^0$-bit position of the input image data, and releases the result of said logic calculation as the image signal of $2^0$-bit position including a small dither signal.

FIG. 16 shows the relation between the input data and the random numbers (added values) PN1, PN2 in said embodiment.

As shown in FIG. 16, if the input image signal has two lower bits "$00_B$" (suffix B standing for binary) such as an input image signal "16", the added value by the random numbers PN1, PN2 is "+3" for (PN1, PN2)=(1, 1), "+1" for (PN1, PN2)=(0, 1), "+2" for (PN1, PN2)=(1, 0), or "0" for (PN1, PN2)=(0, 0). In this manner values 0 to +3 are randomly added. Similarly values −1 to +2 are randomly added to an input image signal having two lower bits "$01_B$" such as "13", values −2 to +1 are randomly added to an image signal having two lower bits "$10_B$" such as "14", and values −3 to 0 are added to an image signal having two lower bits "$11_B$" such as "15".

A similar effect as in the foregoing embodiment can be obtained by adding small dither signals to the lower two bits of the input image signal.

Furthermore, also in a case of binary digitization with the error dispersing method, an effect similar to that in the foregoing embodiments can be obtained by adding small dither signals, obtained from the pseudo random number generator shown in FIGS. 13 or 15, to the least significant bit or other lower digit bit of the multi-level signal after the error correction on the contemplated pixel.

In the foregoing two embodiments, the exclusive logic summing of the input image signal and the random number PN is achieved by an exclusive OR gate, but a similar result can naturally be obtained with other gates such as AND, NAND, NOR, OR and EX-NOR gates.

As detailedly explained in the foregoing, these embodiments allow to realize a circuit for adding small dither signals in a less expensive and simpler structure. Also since the binary digitization with the average density conserving method or the error dispersing method is conducted on the input data including added dither signal, it is rendered possible to prevent the formation of periodic patterns on the output image, thereby reproducing a high-quality image.

The foregoing embodiments have been limited to the case of input data of a color, but the present invention is also applicable to a color image by employing three different (R, G, B) input data.

Also, the foregoing embodiments have been limited to the case of converting the input data into binary data as a gradation processing, but the present invention is likewise applicable to a case of converting the input data into multi-level data.

The present invention has been explained by preferred embodiments thereof, but the present invention is not limited to such embodiments and is subject to various modifications within the scope and spirit of the appended claims.

What is claimed is:

1. An image processing apparatus which outputs as a halftone image an image obtained by converting input multi-level image data into data having a gradation level which is less than that of the input multi-level image data, said apparatus comprising:

input means for entering image data of a contemplated pixel within an input image;

memory means for storing already-binarized data generated from the input image;

calculation means for determining average density of a predetermined area with the already-binarized data by using the already-binarized data without using a binarization prediction value of the contemplated pixel;

binarizing means for binarizing the image data of the contemplated pixel, based on the average density obtained by said calculation means, and feeding back the binarized data to said calculation means;

correction means for distributing a difference between the entered image data and the average density, to the input image data of plural other pixels within the input image with distribution factors based on a predetermined signal, thereby compensating for the difference between the entered image data and the average density; and output means for outputting a reproduction image on the basis of the binarization data from said binarizing means.

2. An apparatus according to claim 1, wherein said input means is adapted to enter, as the image data of the contemplated pixel, data including errors generated in the binarization of image data of preceding pixels.

3. An apparatus according to claim 1, wherein said calculation means is adapted to calculate the average density of the predetermined area based on the binarized data and a predetermined weighting mask.

4. An apparatus according to claim 3, wherein said calculation means comprises a read-only memory addressed by binary data of the already binarized predetermined area and releasing the average density.

5. An apparatus according to claim 1, wherein said binarizing means is adapted to binarize the image data of the contemplated pixel, utilizing the average density obtained by said calculation means as the threshold value.

6. An apparatus according to claim 1, wherein the error compensated by said correction means is the difference between the binary data obtained by said binarizing means and said average density.

7. An apparatus according to claim 6, wherein said correction means comprises random number generating means, and is adapted to distribute the error to the input image data of plural pixels with distribution factors determined by random numbers generated by said random number generating means.

8. An image processing apparatus which outputs as a halftone image an image obtained by converting input multi-level image data into data having a gradation level which is less than that of the input multi-level image data, said apparatus comprising:

memory means for storing data of an already-binarized predetermined area from an input image;

calculation means for calculating, from the data of the already-binarized predetermined area, an average density of the predetermined area by using the data of the already-binarized predetermined area, without using a binarization prediction value of a contemplated pixel within the input image;

binarizing means for binarizing multi-level image data of the contemplated pixel based on the average obtained by said calculation means, and feeding back the binarized data to said calculation means;

error dispersion means for dispersing a difference between the input image data and the average generated in the calculation by said calculation means, to the multi-level image data of pixels in the vicinity of the contemplated pixel;

random number generating means for generating pseudo-random numbers; and output means for outputting a reproduction image on the basis of the binarization data from said binarizing means, wherein said error dispersion means is adapted to disperse the difference between the input image data and the average to the multi-level image data of the pixels in the vicinity, with distribution factors determined by the pseudo-random numbers.

9. An apparatus according to claim 8, wherein said binarizing means is adapted to binarize the multi-level image data into binary data, utilizing the average obtained by said calculation means as the threshold value.

10. An image processing apparatus which outputs as a halftone image an image obtained by converting input multi-level image data into data having a gradation level which is less than that of the input multi-level image data, said apparatus comprising:

memory means for storing data of an already-binarized predetermined area from an input image;

calculation means for calculating, from the data of the already-binarized predetermined area, an average density of the predetermined area by using the data of the already-binarized predetermined area without using a binarization prediction value of a contemplated pixel within the input image;

binarizing means for binarizing multi-level image data, based on the average obtained by said calculation means, and feeding back the binarized data to said calculation means;

random number generating means for generating pseudo-random numbers;

average correction means for correcting the average based on the pseudo-random numbers;

error correction means for dispersing a difference between the entered image data and the corrected average generated in the binarization by said binarizing means; and output means for outputting a reproduction image on the basis of the binarized data from said binarizing means.

11. An apparatus according to claim 10, wherein said binarizing means is adapted to binarize the multi-level image data, utilizing the average, corrected by said average correction means, as the threshold value.

12. An apparatus according to claim 10, wherein said error correction means disperses the difference between the corrected image data and the average density to multi-level image data of pixels in the vicinity of the contemplated pixel.

13. An image processing apparatus which outputs as a halftone image an image obtained by converting input multi-level image data into data having a gradation level which is less than that of the input multi-level image data, said apparatus comprising:

input means for entering multi-level image data of a contemplated pixel within an input image;

memory means for storing data of an already-binarized predetermined area from an input image;

calculation means for calculating, from data of the already-binarized predetermined area without using a binarization prediction value of the contemplated pixel, an average density of the predetermined area;

random number generating means for generating pseudo-random numbers;

correction means for correcting the multi-level image data entered by said input means, based on the pseudo-random numbers;

binarizing means for binarizing the multi-level image data corrected by said correction means, based on the average obtained by said calculation means, and feeding back the binarizing data to said calculation means;

error correction means for dispersing a difference between the corrected image data and the average density, generated in the binarization by said binarizing means; and output means for outputting a reproduction image on the basis of the binarized data from said binarizing means.

14. An apparatus according to claim 13, wherein said binarizing means is adapted to binarize the corrected multi-level image data, utilizing the average as the threshold value.

15. An apparatus according to claim 13, wherein said error correction means disperses the difference between the corrected image data and the average density to multi-level image data of pixels in the vicinity of the contemplated pixel.

16. An image processing apparatus which outputs as a halftone image an image obtained by converting input multi-level image data into data having a gradation level which is less than that of the input multi-level image data, said apparatus comprising:

input means for entering a multi-level image signal;

random number generating means for generating random numbers in synchronization with the input image signal;

calculation means for effecting an exclusive OR calculation on a signal at a single predetermined bit position of the bits of the image signal entered by said input means and the random number generated by said random number generating means;

output means for releasing the result of the calculation provided by said calculation means, replacing the signal of the predetermined bit position;

digitizing means for digitizing the data output from said output means; and correction means for correcting an error generated by said digitizing means to provide an output image.

17. An apparatus according to claim 16, further comprising process means for converting the output signal of said output means into a binary signal with an intermediate tone processing.

* * * * *

UNITED STATES PATENT AND TRADEMARK OFFICE
CERTIFICATE OF CORRECTION

PATENT NO. : 5,577,136
DATED : November 19, 1996
INVENTOR(S) : HIROSHI TANIOKA, ET AL.

It is certified that error appears in the above-indentified patent and that said Letters Patent is hereby corrected as shown below:

COLUMN 2:

Line 6, "images" should read --image--.

COLUMN 6:

Line 58, "1 (1)" should read --(1)--.

COLUMN 11:

Line 51, "despite of the" should read --despite the--.

COLUMN 12:

Line 10, "data a $22^n$-th" should read --data, a $2^n$-th--.

Signed and Sealed this

Eighth Day of July, 1997

Attest:

BRUCE LEHMAN

*Attesting Officer*  *Commissioner of Patents and Trademarks*